United States Patent
Goli et al.

(10) Patent No.: US 11,274,617 B1
(45) Date of Patent: *Mar. 15, 2022

(54) SYSTEM INCLUDING ENGINE AND METHOD OF OPERATING ENGINE

(71) Applicant: Caterpillar Inc., Peoria, IL (US)

(72) Inventors: Suman Goli, San Diego, CA (US); Andrew Nathan Schifferer, Batavia, IL (US); Kirk Anderson, Yorkville, IL (US); Patrick William Sullivan, Jr., Plainfield, IL (US); Ryan Robert Stoffel, Oswego, IL (US); Phillip Alvin Hartz, Sugar Grove, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/995,940

(22) Filed: Aug. 18, 2020

(51) Int. Cl.
*F02D 41/14* (2006.01)
*F02D 41/02* (2006.01)
*F02D 41/26* (2006.01)

(52) U.S. Cl.
CPC ..... *F02D 41/0245* (2013.01); *F02D 41/1446* (2013.01); *F02D 41/263* (2013.01); *F02D 2200/0802* (2013.01); *F02D 2200/1006* (2013.01); *F02D 2250/18* (2013.01)

(58) Field of Classification Search
CPC ............... F02D 41/0245; F02D 41/263; F02D 41/1446; F02D 2200/0802; F02D 2200/1006; F02D 2250/18
USPC .......... 123/436, 672, 676; 701/103–105, 110
See application file for complete search history.

(56) References Cited

U.S. PATENT DOCUMENTS

| | | | |
|---|---|---|---|
| 8,820,057 | B2 | 9/2014 | Hageman et al. |
| 8,881,505 | B2 * | 11/2014 | Frazier .................... F01N 9/002 60/285 |
| 9,267,445 | B2 * | 2/2016 | Pursifull ............... F02D 19/082 |
| 10,794,306 | B2 * | 10/2020 | Goli ....................... B60W 20/11 |
| 2005/0155345 | A1 | 7/2005 | Nakamura |

FOREIGN PATENT DOCUMENTS

| | | |
|---|---|---|
| EP | 3001017 | 3/2016 |
| JP | 2005337062 | 12/2005 |
| JP | 4852081 | 1/2012 |
| WO | 2011117188 | 9/2011 |
| WO | 2014046664 | 3/2014 |

* cited by examiner

*Primary Examiner* — Hai H Huynh (57) ABSTRACT

A system includes an engine adapted to output a torque, a parasitic load adapted to receive a portion of the torque from the engine, and a controller communicably coupled to the parasitic load. The controller is configured to determine an actual exhaust temperature value of an exhaust gas flow exiting the engine and a minimum fuel amount to be injected into the engine. The controller is configured to compare the actual exhaust temperature value with an exhaust temperature threshold value of the exhaust gas flow to determine a first difference between the actual exhaust temperature value and the exhaust temperature threshold value. The controller is configured to determine a target torque output of the engine based on the first difference and the minimum fuel amount. The controller is configured to cause the torque to be increased to attain the target torque output using the parasitic load.

20 Claims, 5 Drawing Sheets

SYSTEM INCLUDING ENGINE AND METHOD OF OPERATING ENGINE

TECHNICAL FIELD

The present disclosure relates to a system including an engine and a method of operating the engine.

BACKGROUND

Machines, such as wheel loaders, dozers, excavators, and the like, are used to perform various tasks at a worksite. To effectively perform these tasks, the machines include an engine, such as an internal combustion engine, that provides a torque output. Further, the machines include an aftertreatment module to remove/reduce particulate matter from an exhaust gas flow exiting the engine. The aftertreatment module includes a Diesel Oxidation Catalyst (DOC) that is used to control diesel particulate emissions, a particulate filter, and/or other catalyst/filters. In some cases, the DOC may facilitate a regeneration of the particulate filter for removing particulate matter from the particulate filter. For example, the DOC may promote particulate filter regeneration by oxidizing soot of the particulate filter using heat from the exhaust gas flow. However, under certain operating conditions, for example at low torque output, low environmental temperatures, and/or the like, an exhaust temperature of the exhaust gas flow may fall below a threshold value required to provide regeneration of the particulate filter.

Moreover, a minimum amount of fuel needs to be present in the exhaust gas flow being directed towards the aftertreatment module. More particularly, the minimum amount of fuel is required to enable adequate combustion to prevent hydrocarbon build-up in the aftertreatment module. Thus, for efficient operation of the aftertreatment module, the exhaust gas flow may have to achieve high temperatures and also contain some amount of fuel therein.

WO Patent Application Number 2011/117188 describes a device for carrying out a regeneration process in a soot particle filter. An oxidizing catalyst being arranged upstream of the soot particle filter in order to increase the temperature of an exhaust gas flow that is supplied by a diesel engine. According to the invention, a parasitic load is connected to a hydraulic circuit that is driven by means of the diesel engine, if a trigger criterion that indicates the regeneration of the soot particle filter is satisfied.

SUMMARY OF THE DISCLOSURE

In an aspect of the present disclosure, a system is provided. The system includes an engine adapted to output a torque. The system also includes a parasitic load adapted to receive a portion of the torque from the engine. The system further includes a controller communicably coupled to the parasitic load. The controller is configured to determine an actual exhaust temperature value of an exhaust gas flow exiting the engine and a minimum fuel amount to be injected into the engine. The controller is also configured to compare the actual exhaust temperature value with an exhaust temperature threshold value of the exhaust gas flow to determine a first difference between the actual exhaust temperature value and the exhaust temperature threshold value. The controller is further configured to determine a target torque output of the engine based on the first difference and the minimum fuel amount to be injected into the engine. The controller is configured to cause the torque of the engine to be increased to attain the target torque output using the parasitic load.

In another aspect of the present disclosure, a method of operating an engine is provided. The method includes determining, by a controller, an actual exhaust temperature value of an exhaust gas flow exiting the engine and a minimum fuel amount to be injected into the engine. The method also includes comparing, by the controller, the actual exhaust temperature value with an exhaust temperature threshold value of the exhaust gas flow to determine a first difference between the actual exhaust temperature value and the exhaust temperature threshold value. The method further includes determining, by the controller, a target torque output of the engine based on the first difference and the minimum fuel amount to be injected into the engine. The method includes causing, by the controller, a torque of the engine to be increased to attain the target torque output using a parasitic load, wherein the parasitic load is adapted to receive a portion of the torque from the engine and is communicably coupled to the controller.

Other features and aspects of this disclosure will be apparent from the following description and the accompanying drawings.

DETAILED DESCRIPTION

Reference will now be made in detail to specific aspects or features, examples of which are illustrated in the accompanying drawings. Wherever possible, corresponding or similar reference numbers will be used throughout the drawings to refer to the same or corresponding parts.

Figure 1:
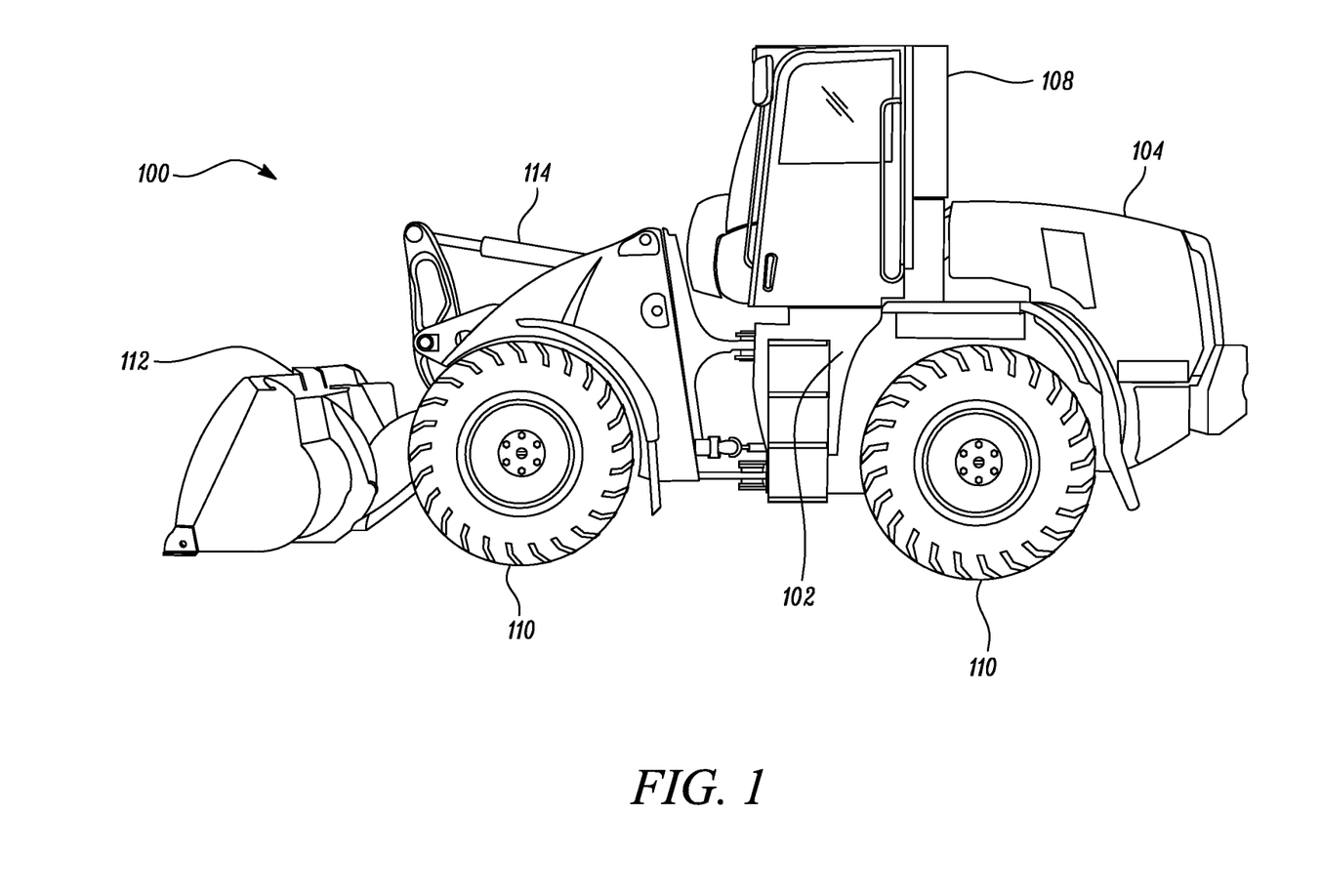
FIG. 1 is a side view of an exemplary machine having an engine.

Referring to FIG. 1, an exemplary machine 100 is illustrated. In the illustrated example, the machine 100 is a wheel loader. Alternatively, the machine 100 may include any other type of machine, such as a dozer, a haul truck, an excavator, and the like. The machine 100 includes a frame 102 to support various components of the machine 100 thereon. The machine 100 also includes an engine enclosure 104 for receiving an engine 106 (shown in FIG. 2) of the machine 100.

Further, the machine 100 includes an operator station 108, a pair of ground engaging members 110, and a powertrain (not shown) to drive the ground engaging members 110. Moreover, the machine 100 includes an implement 112 that may be used to perform one or more work operations. The implement 112 may be operated based on operation of one or more actuators 114 associated with the implement 112. Further, the actuators 114 are operated by a hydraulic system of the machine 100 based on user inputs.

Figure 2:
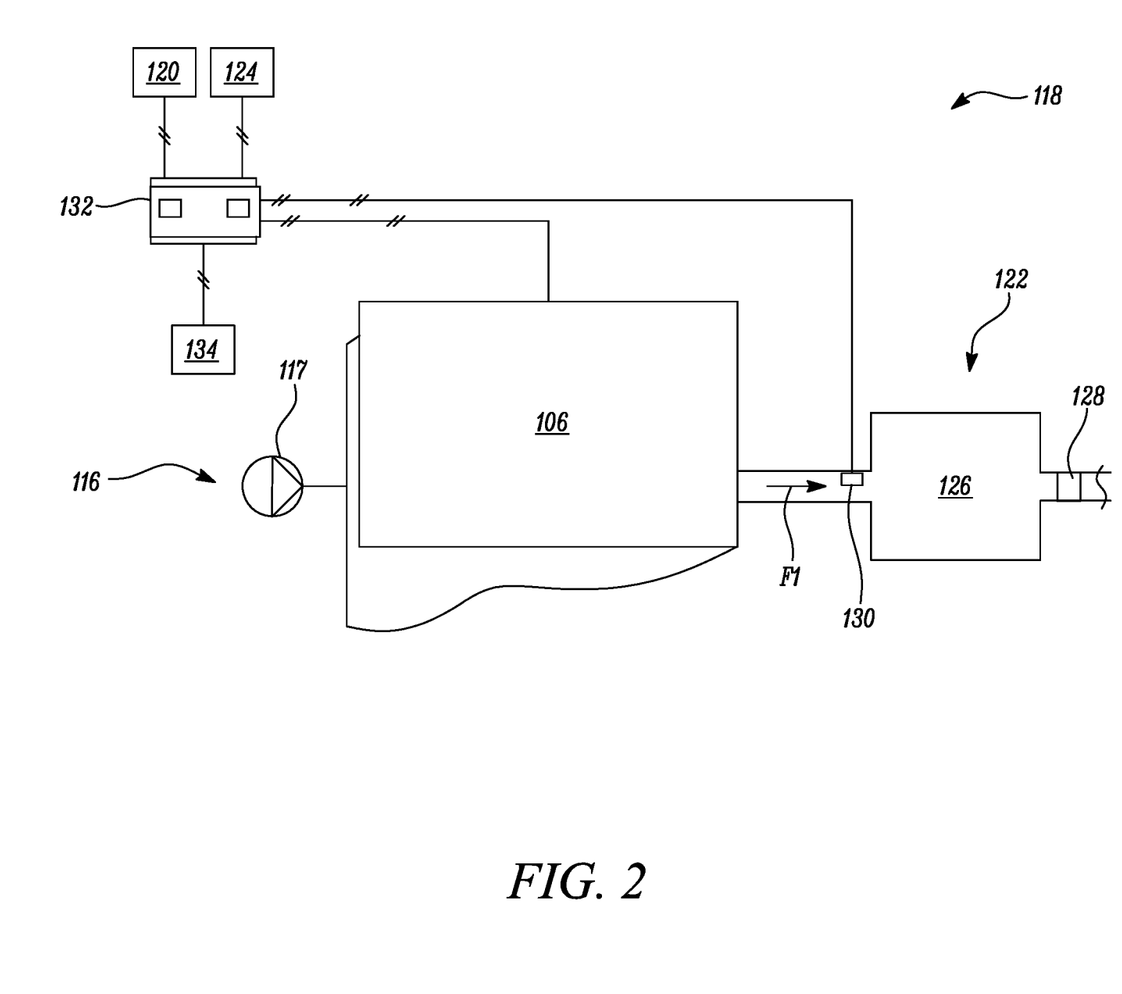
FIG. 2 is a schematic diagram of a system associated with the machine of FIG. 1, according to one embodiment of the present disclosure.

Moreover, the hydraulic system includes a pump 117 (schematically shown in FIG. 2). In the illustrated example, the pump 117 is embodied as an implement pump that pressurizes and directs hydraulic fluid towards the actuators 114 for operating the implement 112. Alternatively, the pump 117 may be used for operation of any other component of the machine 100, without any limitations. In some examples, the pump 117 may embody a hydraulic pump or an electrohydraulic pump. In an example, the pump 117 may embody a displacement controlled pump. Further, the pump 117 may include a variable displacement pump or a fixed displacement pump.

Referring to FIG. 2, the machine 100 includes a system 118. The system 118 includes the engine 106 that outputs a torque. Overall, the torque may be used for operational and mobility requirements of the machine 100. For example, the torque may be used to perform operations, such as, moving the implement 112, driving the ground engaging members 110, and/or operating various devices in the operator station 108 of the machine 100. Further, a portion of this torque is directed towards a parasitic load 116 that will be explained later in this section. The portion of the torque that is directed towards the parasitic load 116 may be referred to as a parasitic torque.

In the illustrated embodiment, the engine 106 is an internal combustion engine that produces mechanical power output and/or electrical power output. Moreover, the engine 106 is a four-stroke diesel engine. In other embodiments, the engine 106 may be any other type of internal combustion engine such as a gasoline engine, a gaseous fuel-powered engine, a dual fuel engine, and the like. In other embodiments, a two-stroke internal combustion engine may also be utilized.

The engine 106 may include various components (not shown), such as, a fuel system, an intake manifold, engine cylinders in selective fluid communication with the intake manifold, an air induction system, a lubrication system, a cooling system, an Exhaust Gas Recirculation (EGR) system, and the like. The EGR system may reduce harmful emissions from an exhaust gas flow "F1" of the engine 106 by recirculating a portion of the exhaust gas flow "F1" back to the engine cylinders.

The fuel system of the engine 106 includes a fuel injector for injecting fuel into the engine cylinders. Further, the fuel system may include a fuel sensor 120 associated therewith. The fuel sensor 120 may measure an actual fuel amount being injected into the engine 106. The actual fuel amount may be based on a normal loading condition of the engine 106. The fuel sensor 120 may include, for example, a needle lift sensor, an optical sensor, a piezoresistive pressure transmitter, and the like.

It should be noted that a minimum fuel amount needs to be injected into the engine cylinders. The term "minimum fuel amount" as referred to herein may be defined as an amount of fuel that may be sufficient to reach a high combustion temperature in the engine 106 and also to effectively perform a regeneration process in an aftertreatment module 122.

Further, the intake manifold directs intake air, that may also include a portion of the recirculated exhaust gases, towards the engine cylinders. The intake manifold may include a pressure sensor (not shown), an Intake Manifold Air Temperature (IMAT) sensor 124, and the like to detect characteristics of the intake air. More particularly, an IMAT value is measured by the IMAT sensor 124.

Further, the machine 100 includes the aftertreatment module 122. The aftertreatment module 122 may include a Diesel Oxidation Catalyst (DOC) 126 and a particulate filter 128 (such as a diesel particulate filter) positioned downstream of the DOC 126. In some examples, the aftertreatment module 122 may also include a Selective Catalytic Reduction (SCR) module (not shown).

The DOC 126 receives the exhaust gas flow "F1" from the engine 106. During the regeneration process in the aftertreatment module 122, heat is generated in the DOC 126 during flameless exothermic reaction between oxygen and fuel. Heat generated during initial period of the regeneration process may be absorbed by the DOC 126. Once the DOC 126 reaches a certain temperature level, the particulate filter 128 starts to warm up and soot may start to oxidize. It should be noted that the particulate filter 128 may be heated by the exhaust gas flow "F1" from the engine 106, thereby thermally aging or oxidizing particulate matter (e.g., soot) deposited in the particulate filter 128 when an actual exhaust temperature of the exhaust gas flow "F1" corresponds to an exhaust temperature threshold value of the exhaust gas flow "F1". The term "exhaust temperature threshold value" as referred to herein may be defined as a value of the temperature of the exhaust gas flow "F1" that is sufficient for the regeneration process to occur. In one example, the exhaust temperature threshold value may be approximately 290 degrees Celsius (C) or in a range of approximately 280 degrees C. to 320 degrees C. Thus, it is desirable that the actual exhaust temperature of the exhaust gas flow "F1" is sufficiently high for the regeneration process to occur. Moreover, it is also desirable to have some amount of fuel present in the exhaust gas flow "F1" that enters the aftertreatment module 122. More particularly, a portion of the fuel injected into the engine cylinders may combust partially in the engine cylinders and a remaining portion of the fuel may combust in the aftertreatment module 122.

Further, an actual exhaust temperature value is measured at the aftertreatment module 122 coupled with the engine 106. For this purpose, the aftertreatment module 122 includes an exhaust temperature sensor 130 that measures the actual exhaust temperature value of the exhaust gas flow "F1". The exhaust temperature sensor 130 may be located upstream of the DOC 126, and more specifically, proximate to an inlet of the DOC 126. Alternatively, the exhaust temperature sensor 130 may be disposed downstream of the DOC 126, and more specifically, proximate to an outlet of the DOC 126, or within the DOC 126. In other examples, the exhaust temperature sensor 130 may be located upstream of the SCR module.

Further, the system 118 also includes the parasitic load 116 that receives the portion of the torque from the engine 106. The parasitic load 116, with regards to the machine 100, can be defined as a load on the engine 106 that may not contribute to tractive efforts. In an example, the parasitic load 116 is associated with the hydraulic system of the machine 100 or an electrical system of the machine 100. In the illustrated example, the parasitic load 116 includes the pump 117 of the hydraulic system. Alternatively, the parasitic load 116 may embody any other component of the machine 100 that receives the torque from the engine 106 for operation thereof. In an example, the pump 117 may be embodied as the implement pump. In other examples, the pump 117 may include any other pump that operates one or more components of the machine 100, without any limitations. Accordingly, the pump 117 may embody an electrohydraulic/hydraulic pump of variable displacement type that can be infinitely varied to vary engine loading. In other examples, the pump 117 may include a fixed displacement type pump, without any limitations.

Further, the parasitic load 116 may embody an air compressor, a motor, a blower, radiator fans, an alternator, a lightning system of the machine 100, an external load, an air conditioner, and the like. In some examples, the parasitic load 116 may be associated with a pneumatic system of the machine 100. Further, the parasitic load 116 may embody other components of the machine 100 that can be turned to an on state or an off state. It may be contemplated that the parasitic load 116 may embody a number of components associated with the machine 100, apart from those mentioned above, that may utilize the torque from the engine 106.

The system 118 further includes a controller 132 communicably coupled to the parasitic load 116. The controller 132 is also communicably coupled to various components of the machine 100, such as the engine 106, the fuel sensor 120, the IMAT sensor 124, the exhaust temperature sensor 130, and the like. The controller 132 may include a Central Processing Unit (CPU), a microprocessor, a microcontroller, a control unit, an Engine Control Unit (ECU), a processor, or another type of processing component. In some embodiments, the controller 132 may include one or more processors capable of being programmed to perform certain functions/operations.

The controller 132 is in communication with a memory 134. The memory 134 may be an external memory or the controller 132 may itself include the memory 134. The memory 134 may include, for example, a Random Access Memory (RAM), a Read Only Memory (ROM), and/or another type of dynamic or static storage device such as a flash memory, a magnetic memory, an optical memory, and the like. This memory 134 stores information and/or instructions for use by the controller 132. In some examples, the memory 134 may store various look up tables 136, 138, 140 (shown in FIGS. 3 and 4) that will be explained later in this section. Further, the memory 134 may also store information corresponding to the exhaust temperature threshold values and the minimum fuel amount to be injected into the engine 106.

Figure 3:
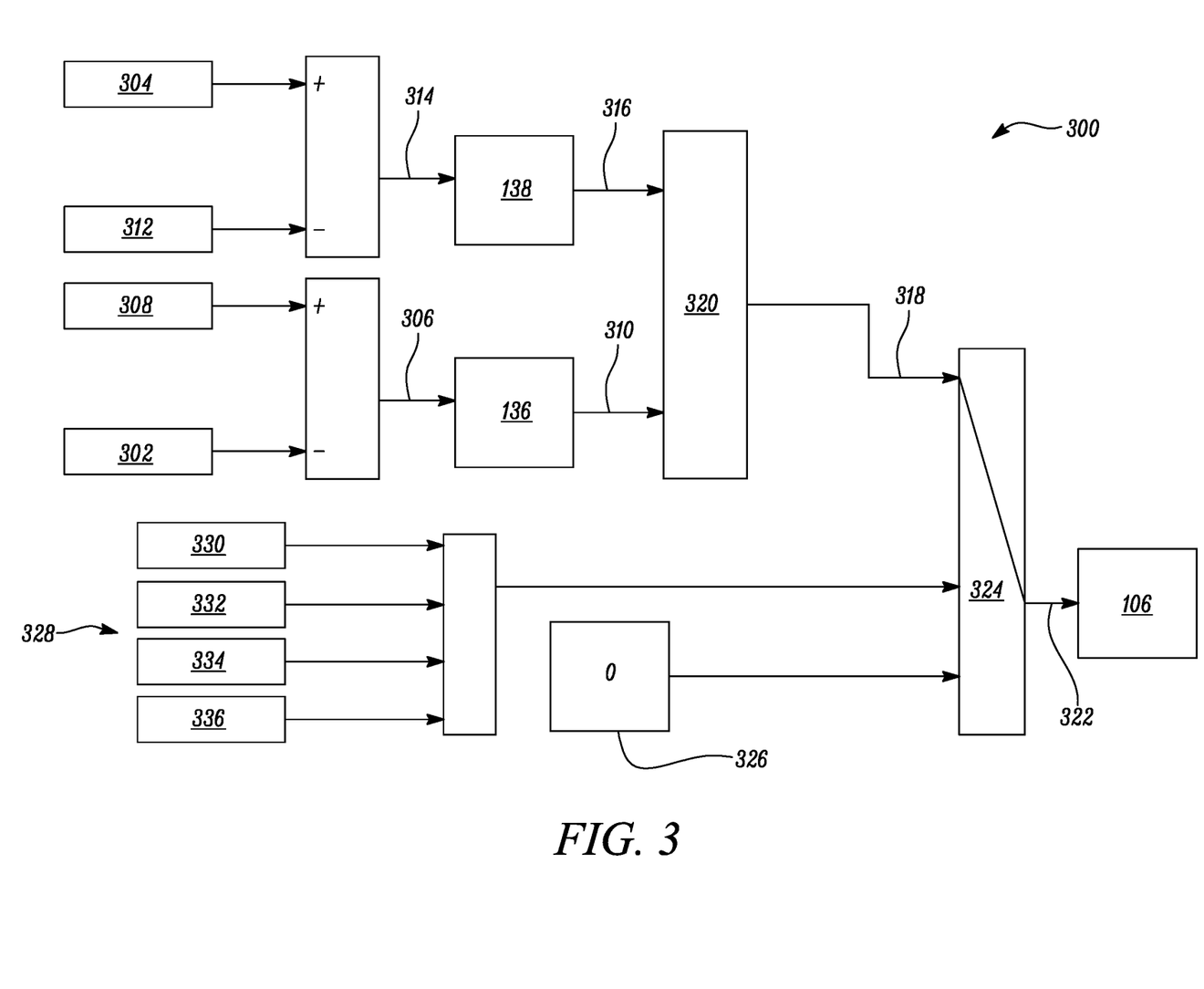
FIG. 3 is a logical diagram for operation of the system of FIG. 2, according to one embodiment of the present disclosure.

FIG. 3 illustrates a first embodiment of the present disclosure. More particularly, FIG. 3 is a logical diagram 300 describing a set of operations that may be performed by the controller 132 (see FIG. 2). The controller 132 determines the actual exhaust temperature value of the exhaust gas flow "F1" (see FIG. 2) exiting the engine 106 and the minimum fuel amount to be injected into the engine 106. A first block 302 represents the actual exhaust temperature value of the exhaust gas flow "F1" herein. The controller 132 determines the actual exhaust temperature value based on information received from the exhaust temperature sensor 130 (see FIG. 2). Further, the controller 132 retrieves the minimum fuel amount to be injected into the engine 106 from the memory 134 (see FIG. 2). A second block 304 represents the minimum fuel amount to be injected into the engine 106 herein.

Further, the controller 132 compares the actual exhaust temperature value with the exhaust temperature threshold value of the exhaust gas flow "F1" to determine a first difference 306 between the actual exhaust temperature value and the exhaust temperature threshold value. A third block 308 represents the exhaust temperature threshold value of the exhaust gas flow "F1" herein. The controller 132 may retrieve the exhaust temperature threshold value from the memory 134. The controller 132 may analyze the actual exhaust temperature value from the exhaust temperature sensor 130 and the exhaust temperature threshold value to determine the first difference 306. It should be noted that the first difference 306 is embodied as a temperature error herein. Further, the controller 132 determines a first torque output value 310 based on the first difference 306. More particularly, the controller 132 may determine the first torque output value 310 using the first look up table 136. For example, the first look up table 136 may identify the first difference 306 and the first torque output value 310 corresponding to the first difference 306. The first look up table 136 may store various values for the first difference 306 and corresponding values 310 for the first torque output.

Moreover, in the illustrated embodiment, the controller 132 receives the actual fuel amount injected into the engine 106. A fourth block 312 represents the actual fuel amount injected into the engine 106 herein. The actual fuel amount injected into the engine 106 is determined by the controller 132 based on inputs from the fuel sensor 120 (see FIG. 2). The controller 132 also compares the actual fuel amount injected into the engine 106 with the minimum fuel amount to be injected into the engine 106 to determine a second difference 314 between the actual fuel amount and the minimum fuel amount. The controller 132 may analyze the actual fuel amount and the minimum fuel amount to determine the second difference 314. It should be noted that the second difference 314 is embodied as a fuel error herein.

The controller 132 also determines a second torque output value 316 based on the minimum fuel amount to be injected into the engine 106. In the illustrated embodiment, the controller 132 determines the second torque output value 316 based on the second difference 314. More particularly, the controller 132 may determine the second torque output value 316 using the second look up table 138. For example, the second look up table 138 may identify the second difference 314 and the second torque output value 316 corresponding to the second difference 314. The second look up table 138 may store various values for the second difference 314 and corresponding values 316 for the second torque output.

Further, the controller 132 determines a target torque output 318 of the engine 106 based on the first difference 306 and the minimum fuel amount to be injected into the engine 106. The term "target torque output" as referred to in the present disclosure may be defined as a value of the torque output that corresponds to the exhaust temperature threshold value and/or the minimum fuel amount. In one example, the target torque output 318 is determined based on a minimum load on the engine 106 needed to attain the exhaust temperature threshold value. Further, the target torque output 318 corresponds to the first torque output value 310 or the second torque output value 316. More particularly, the controller 132 compares the second torque output value 316 with the first torque output value 310 to determine the target torque output 318 of the engine 106. It should be noted that a higher value of the first torque output value 310 and the second torque output value 316 corresponds to the target torque output 318. In some cases, the controller 132 may determine the target torque output 318 based on a first selector 320. For example, the first selector 320 may analyze the first torque output value 310 and the second torque output value 316 to determine the higher value that corresponds to the target torque output 318.

Further, the controller 132 causes the torque of the engine 106 to be increased to attain the target torque output 318 using the parasitic load 116 (see FIG. 2). More particularly, the controller 132 may send a command 322 to the engine 106 to cause the torque of the parasitic load 116 to be increased based on the target torque output 318. In one example, the controller 132 may transmit the command 322 to the engine 106 to cause a torque of the implement 112 (see FIG. 1) to be increased. For example, the controller 132 transmits the command 322 to increase a stroke of the pump 117 to increase the torque of the engine 106. In other examples, when the parasitic load 116 is embodied as any other component of the machine 100, the controller 132 may transmit the command 322 to the engine 106 to cause a torque of the said component to be increased.

In some cases, the controller 132 may determine if the torque output needs to be increased and accordingly transmits the command 322 based on a second selector 324. The second selector 324 may determine whether the torque output needs to be increased, or whether no action is to be taken (indicated by a block 326), based on a set of conditions 328. The set of conditions 328 may include a first condition 330 that the engine 106 has requested the regeneration process using the parasitic load 116, a second condition 332 that the engine 106 is operational, a third condition 334 that regeneration assist is enabled, and a fourth condition 336 that the DOC 126 (see FIG. 2) is operational (for example, not associated with an error state), and the like. When the set of conditions 328 are satisfied, the controller 132 may cause the torque output to be increased using the torque.

Figure 4:
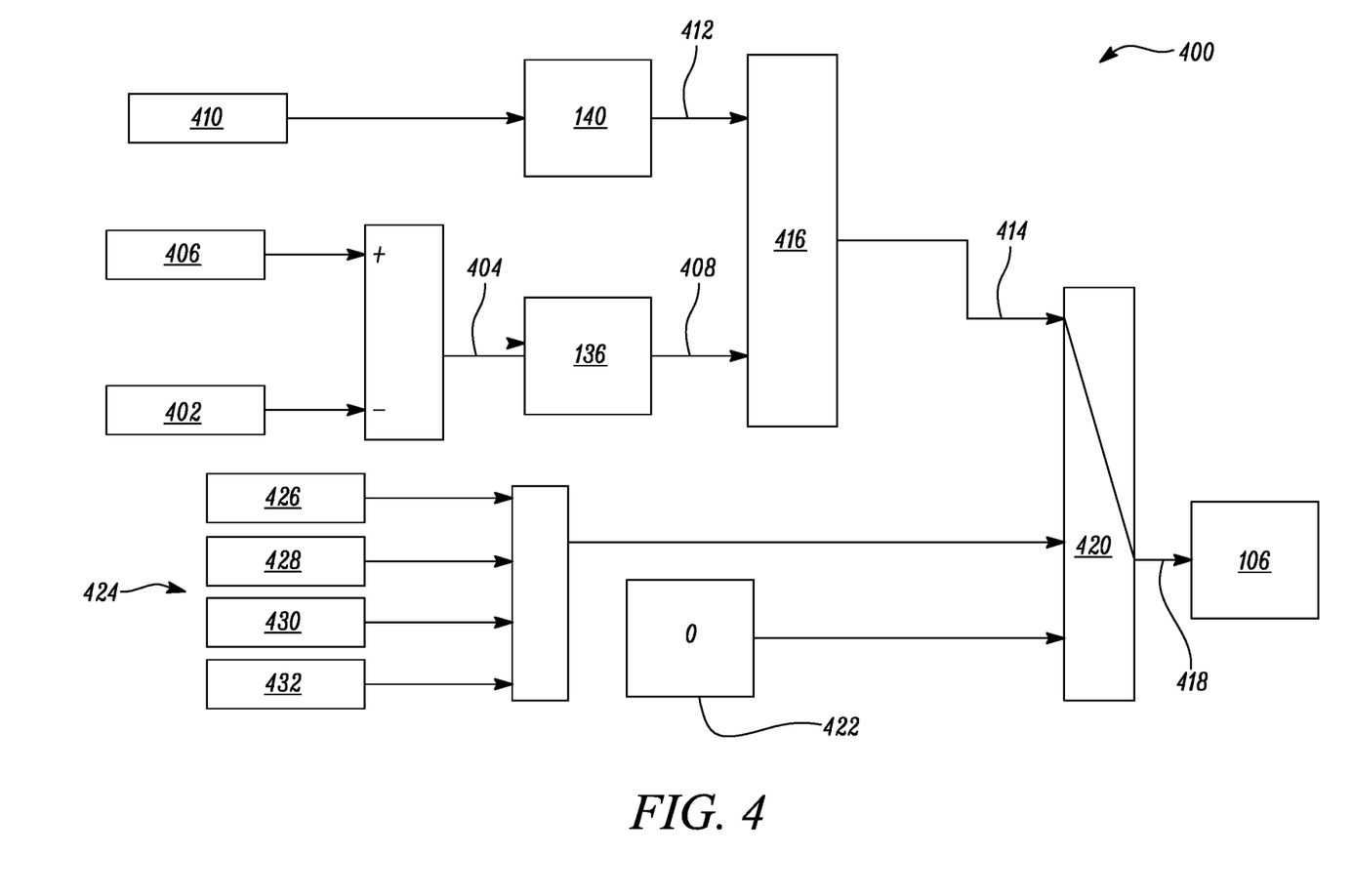
FIG. 4 is a logical diagram for operation of the system of FIG. 2, according to another embodiment of the present disclosure.

FIG. 4 illustrates a second embodiment of the present disclosure. More particularly, FIG. 4 is a logical diagram 400 describing a set of operations that may be performed by the controller 132 (see FIG. 2). The controller 132 determines the actual exhaust temperature value of the exhaust gas flow "F1" (see FIG. 2) exiting the engine 106 and the minimum fuel amount to be injected into the engine 106. A first block 402 represents the actual exhaust temperature value of the exhaust gas flow "F1" herein. The controller 132 determines the actual exhaust temperature value based on information received from the exhaust temperature sensor 130 (see FIG. 2). Further, the controller 132 retrieves the minimum fuel amount to be injected into the engine 106 from the memory 134 (see FIG. 2).

The controller 132 also compares the actual exhaust temperature value with the exhaust temperature threshold value of the exhaust gas flow "F1" to determine the first difference 404 between the actual exhaust temperature value and the exhaust temperature threshold value. A second block 406 represents the exhaust temperature threshold value of the exhaust gas flow "F1". The controller 132 may retrieve the exhaust temperature threshold value from the memory 134. The controller 132 may analyze the actual exhaust temperature value from the exhaust temperature sensor 130 and the exhaust temperature threshold value to determine the first difference 404. It should be noted that the first difference 404 is embodied as the temperature error herein. Further, the controller 132 determines a first torque output value 408 based on the first difference 404. More particularly, the controller 132 may determine the first torque output value 408 using the first look up table 136. For example, the first look up table 136 may identify values for the first difference 404 and corresponding values 408 for the first torque output.

Moreover, in the illustrated embodiment, the controller 132 receives the IMAT value. A third block 410 represents the IMAT value herein. The IMAT value is received by the controller 132 from the IMAT sensor 124 (see FIG. 2). The controller 132 also determines the minimum fuel amount to be injected into the engine 106 based on the IMAT value. More particularly, the controller 132 may determine the minimum fuel amount using the third look up table 140. For example, the third look up table 140 may identify the IMAT value and the minimum fuel amount corresponding to the IMAT value.

The controller 132 further determines a second torque output value 412 based on the minimum fuel amount to be injected into the engine 106. More particularly, the controller 132 may determine the second torque output value 412 using the third look up table 140. For example, the third look up table 140 may identify the minimum fuel amount and the second torque output value 412 corresponding to the minimum fuel amount. The third look up table 140 may store various IMAT values and corresponding values for the minimum fuel amount and the values 412 for the second torque output.

The controller 132 determines a target torque output 414 of the engine 106 based on the first difference 404 and the minimum fuel amount to be injected into the engine 106. It should be noted that the target torque output 414 is determined based on the minimum load on the engine 106 needed to attain the exhaust temperature threshold value. Further, the target torque output 414 corresponds to the first torque output value 408 or the second torque output value 412. More particularly, the controller 132 compares the second torque output value 412 with the first torque output value 408 to determine the target torque output 414 of the engine 106. It should be noted that a higher value of the first torque output value 408 and the second torque output value 412 corresponds to the target torque output 414. In some cases, the controller 132 may determine the target torque output 414 based on a first selector 416. For example, the first selector 416 may analyze the first torque output value 408 and the second torque output value 412 to determine the higher value that corresponds to the target torque output 414.

Further, the controller 132 causes the torque of the engine 106 to be increased to attain the target torque output 414 using the parasitic load 116 (see FIG. 2). More particularly, the controller 132 may send a command 418 to the engine 106 to cause the torque of the parasitic load 116 to be increased based on the target torque output 414. In one example, the controller 132 may transmit the command 418 to the engine 106 to cause the torque of the implement 112 (see FIG. 1) to be increased. For example, the controller 132 transmits the command 418 to increase the stroke of the pump 117 to increase the torque of the engine 106. In other examples, when the parasitic load 116 is embodied as any other component of the machine 100, the controller 132 may transmit the command 418 to the engine 106 to cause a torque of the said component to be increased.

In some cases, the controller 132 may determine if the torque output needs to be increased and accordingly transmits the command 418 based on a second selector 420. The second selector 420 may determine whether the torque output needs to be increased, or whether no action is to be taken (indicated by a block 422), based on a set of conditions 424. The set of conditions 424 may include the first condition 426, the second condition 428, the third condition 430, and the fourth condition 432 similar to the first, second, third, and fourth conditions 330, 332, 334, 336, respectively, that were explained in relation to the first embodiment of FIG. 3. When the set of conditions 424 are satisfied, the controller 132 may cause the torque output to be increased using the torque.

INDUSTRIAL APPLICABILITY

Figure 5:
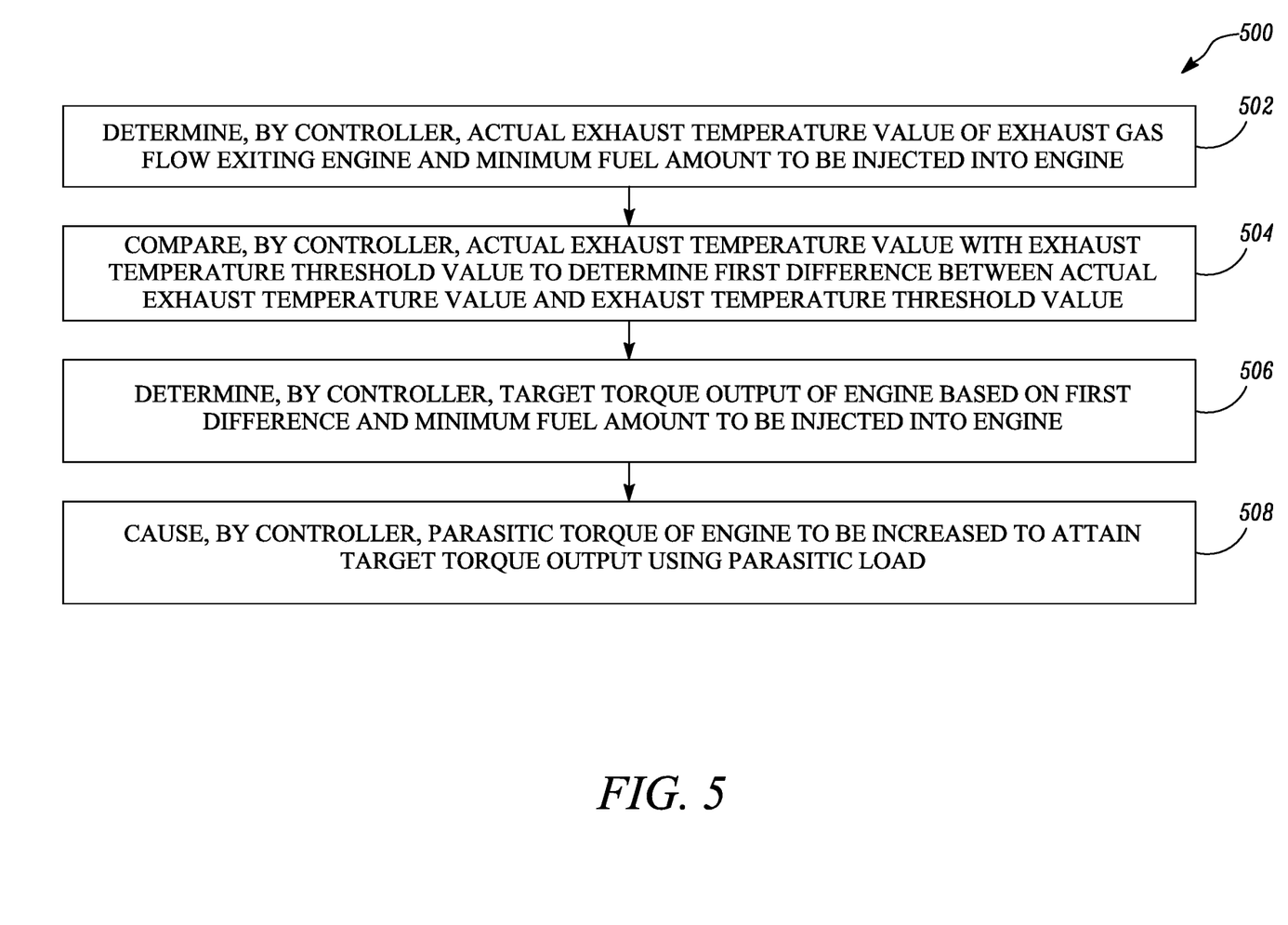
FIG. 5 is a flowchart for a method of operating the engine, according to one embodiment of the present disclosure.

FIG. 5 illustrates a method 500 of operating the engine 106. At step 502, the controller 132 determines the actual exhaust temperature value of the exhaust gas flow "F1" exiting the engine 106 and the minimum fuel amount to be injected into the engine 106. Further, the actual exhaust temperature value is measured at the aftertreatment module 122 coupled with the engine 106. At step 504, the controller 132 compares the actual exhaust temperature value with the exhaust temperature threshold value of the exhaust gas flow "F1" to determine the first difference 306, 404 between the actual exhaust temperature value and the exhaust temperature threshold value. Further, the controller 132 determines the first torque output value 310, 408 based on the first difference 306, 404.

At step 506, the controller 132 determines the target torque output 318, 414 of the engine 106 based on the first difference 306, 404 and the minimum fuel amount to be injected into the engine 106. Further, the controller 132 also determines the second torque output value 316, 412 based on the minimum fuel amount to be injected into the engine 106. The target torque output 318, 414 corresponds to the first torque output value 310, 408 or the second torque output value 316, 412. In an example, the controller 132 receives the actual fuel amount injected into the engine 106. Further, the controller 132 compares the actual fuel amount injected into the engine 106 with the minimum fuel amount to be injected into the engine 106 to determine the second difference 314 between the actual fuel amount and the minimum fuel amount. The controller 132 also determines the second torque output value 316 based on the second difference 314. Moreover, the controller 132 compares the second torque output value 316 with the first torque output value 310 to determine the target torque output 318 of the engine 106.

In another example, the controller 132 receives the IMAT value. The controller 132 also determines the minimum fuel amount to be injected into the engine 106 based on the IMAT value. Further, the controller 132 determines the second torque output value 412 based on the minimum fuel amount. Moreover, the controller 132 compares the second torque output value 412 with the first torque output value 408 to determine the target torque output 414 of the engine 106. Further, the controller 132 increases the torque of the engine 106 based on the higher value of the first torque output value 310, 408 and the second torque output value 316, 412. It should be noted that the controller 132 determines the target torque output 318, 414 based on the minimum load on the engine 106 needed to attain the exhaust temperature threshold value.

At step 508, the controller 132 causes the torque of the engine 106 to be increased to attain the target torque output 318, 414 using the parasitic load 116. The parasitic load 116 receives the portion of the torque from the engine 106 and is communicably coupled to the controller 132. In an example, the parasitic load 116 is associated with the hydraulic system of the machine 100 or the electrical system of the machine 100. In some examples, the controller 132 transmits the command 322, 418 to increase the stroke of the pump 117 of the hydraulic system to increase the torque of the engine 106.

In some cases, the system 118 and the method 500 may operate in a close-loop manner. For example, the controller 132 may iteratively determine the actual exhaust temperature values and compare the actual exhaust temperature values with the exhaust temperature threshold value to determine the target torque output 318, 414.

The method 500 and the system 118 descried herein may be implemented in a number of machines having different types of transmission systems. Further, the method 500 and the system 118 may be implemented on existing machines. The method 500 and the system 118 described herein may provide an efficient solution for increasing the exhaust temperature of the exhaust gas flow "F1" as well as maintaining some amount of fuel in the exhaust gas flow "F1". This technique may in turn allow efficient operation of the aftertreatment module 122 at low torque output conditions, low environment temperatures, and the like. Additionally, the system 118 and the method 500 utilizes inputs such as the minimum fuel amount injected into the engine 106 or the IMAT value that may aid in maintaining a minimum fuel consumption by the engine 106. Further, presence of some amount of fuel in the exhaust gas flow "F1" allows the exhaust gas flow "F1" to achieve a higher temperature in the aftertreatment module 112 as the fuel combusts during the regeneration process. This approach may lead to efficient regeneration of the particulate filter 128 and may also allow particulate filter longevity by oxidizing particulate matters using the high temperature exhaust gas flow "F1" before occurrence of exothermic events.

Further, the controller 132 may cause the torque output to be increased, therefore increasing a load of the engine 106. The method 500 and the system 118 described herein may allow the minimum load on the engine 106 to be maintained using the torque. Further, the torque may be added only if an actual load on the engine 106 is less than the minimum load to maintain the exhaust temperature threshold value. In the illustrated embodiment, the parasitic load 116 may embody a variety of machine components. Further, when the parasitic load 116 is embodied as the pump 117, the pump 117 may include the fixed displacement pump or the variable displacement pump. Moreover, the parasitic load 116 may be turned on/off or an operation of the parasitic load 116 may be variably controlled to cause the torque to be increased, based on application requirements.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:

1. A system comprising:
   an engine adapted to output a torque;
   a parasitic load adapted to receive a portion of the torque from the engine; and
   a controller communicably coupled to the parasitic load, wherein the controller is configured to:
      determine an actual exhaust temperature value of an exhaust gas flow exiting the engine and a minimum fuel amount to be injected into the engine;
      compare the actual exhaust temperature value with an exhaust temperature threshold value of the exhaust gas flow to determine a first difference between the actual exhaust temperature value and the exhaust temperature threshold value;
      determine a target torque output of the engine based on the first difference and the minimum fuel amount to be injected into the engine; and
      cause the torque of the engine to be increased to attain the target torque output using the parasitic load.

2. The system of claim 1, wherein the controller is further configured to determine a first torque output value based on the first difference.

3. The system of claim 2, wherein the controller is further configured to determine a second torque output value based on the minimum fuel amount to be injected into the engine, and wherein the target torque output corresponds to at least one of the first torque output value and the second torque output value.

4. The system of claim 3, wherein a higher value of the first torque output value and the second torque output value corresponds to the target torque output.

5. The system of claim 3, wherein the controller is further configured to:
receive an actual fuel amount injected into the engine;
compare the actual fuel amount injected into the engine with the minimum fuel amount to be injected into the engine to determine a second difference between the actual fuel amount and the minimum fuel amount;
determine the second torque output value based on the second difference; and
compare the second torque output value with the first torque output value to determine the target torque output of the engine.

6. The system of claim 3, wherein the controller is further configured to:
receive an intake manifold air temperature value;
determine the minimum fuel amount to be injected into the engine based on the intake manifold air temperature value;
determine the second torque output value based on the minimum fuel amount; and
compare the second torque output value with the first torque output value to determine the target torque output of the engine.

7. The system of claim 1, wherein the parasitic load is associated with at least one of a hydraulic system of a machine and an electrical system of the machine.

8. The system of claim 7, wherein the parasitic load includes a pump of the hydraulic system, and wherein the controller is configured to transmit a signal to increase a stroke of the pump to increase the torque of the engine.

9. The system of claim 1, wherein the target torque output is determined based on a minimum load on the engine needed to attain the exhaust temperature threshold value.

10. The system of claim 1, wherein the actual exhaust temperature value is measured at an aftertreatment module coupled with the engine.

11. A method of operating an engine comprising:
determining, by a controller, an actual exhaust temperature value of an exhaust gas flow exiting the engine and a minimum fuel amount to be injected into the engine;
comparing, by the controller, the actual exhaust temperature value with an exhaust temperature threshold value of the exhaust gas flow to determine a first difference between the actual exhaust temperature value and the exhaust temperature threshold value;
determining, by the controller, a target torque output of the engine based on the first difference and the minimum fuel amount to be injected into the engine; and causing, by the controller, a torque of the engine to be increased to attain the target torque output using a parasitic load adapted to receive a portion of the torque from the engine, wherein the parasitic load is communicably coupled to the controller.

12. The method of claim 11 further comprising determining a first torque output value based on the first difference.

13. The method of claim 12 further comprising determining a second torque output value based on the minimum fuel amount to be injected into the engine, wherein the target torque output corresponds to at least one of the first torque output value and the second torque output value.

14. The method of claim 13 further comprising increasing the torque of the engine based on a higher value of the first torque output value and the second torque output value.

15. The method of claim 13 further comprising:
receiving an actual fuel amount injected into the engine;
comparing the actual fuel amount injected into the engine with the minimum fuel amount to be injected into the engine to determine a second difference between the actual fuel amount and the minimum fuel amount;
determining the second torque output value based on the second difference; and
comparing the second torque output value with the first torque output value to determine the target torque output of the engine.

16. The method of claim 13 further comprising:
receiving an intake manifold air temperature value;
determining the minimum fuel amount to be injected into the engine based on the intake manifold air temperature value;
determining the second torque output value based on the minimum fuel amount; and
comparing the second torque output value with the first torque output value to determine the target torque output of the engine.

17. The method of claim 11, wherein the parasitic load is associated with at least one of a hydraulic system of a machine and an electrical system of the machine.

18. The method of claim 17 further comprising transmitting, by the controller, a signal to increase the stroke of a pump of the hydraulic system to increase the torque of the engine.

19. The method of claim 11 further comprising determining, by the controller, the target torque output based on a minimum load on the engine needed to attain the exhaust temperature threshold value.

20. The method of claim 11 further comprising measuring the actual exhaust temperature value at an aftertreatment module coupled with the engine.

* * * * *